United States Patent [19]

Coleman et al.

[11]  4,261,107

[45]  Apr. 14, 1981

[54] COORDINATE LOCATING DEVICE

[75] Inventors: Harold K. Coleman, Midland, Tex.; Kenneth F. Rossman, Morton, Ill.

[73] Assignee: Caterpillar Tractor Co., Peoria, Ill.

[21] Appl. No.: 127,672

[22] Filed: Mar. 6, 1980

Related U.S. Application Data

[63] Continuation-in-part of Ser. No. 30,241, Feb. 8, 1979, abandoned.

[51] Int. Cl.³ .................. G01B 11/03; G01B 9/02
[52] U.S. Cl. .................. 33/174 L; 33/DIG. 4; 356/358; 356/363
[58] Field of Search ............ 33/1 M, 125 A, 169 R, 33/172 E, 174 L, 174 PC, 286, DIG. 4, DIG. 21; 356/352, 356, 358, 360, 363

[56] References Cited

U.S. PATENT DOCUMENTS

| | | | |
|---|---|---|---|
| 3,069,778 | 12/1962 | Schiler | 33/174 R |
| 3,661,463 | 5/1972 | Brainard et al. | 356/363 |
| 3,715,599 | 2/1973 | Marcy | 356/363 |
| 3,790,284 | 2/1974 | Baldwin | 356/360 |
| 3,815,996 | 6/1974 | Colding et al. | 356/363 |
| 3,926,523 | 12/1975 | Chapman | 356/363 |
| 4,053,231 | 10/1977 | Fletcher et al. | 356/363 |

OTHER PUBLICATIONS

"5501A Laser Transducer," Hewlett-Packard Technical Data, Sep. 1973, pp. 1-6.
Hewlett-Packard Technical Data, Descriptions of Various Components of Laser Transducer Systems, Sep. 1973, 11 pages.
Engeman, "A Practical Laser Interferometer for Use in Today's Shop," Tooling and Production, Aug. 1965, pp. 55-56.

Primary Examiner—Richard R. Stearns
Attorney, Agent, or Firm—Charles E. Lanchantin, Jr.

[57] ABSTRACT

A coordinate locating device (8) includes an apparatus (10) having first, second, and third members (21,22,23) such that the first member (21) is movable on a base (14), the second member (22) is movable on the first member (21) and the third member (23) has a positionable element (30) and is movable on the second member (22). The device (8) also includes a laser transducer system (16) for establishing the locations of a starting point (52) and a first plane (54) through the starting point (52) which is associated with the first members (21), a second plane (58) having a second reference point (59) which is associated with the second member (22), and a third plane (62) having a third reference point (63) which is associated with the third member (23), and establishing the precise three dimensional location of the positionable element (30). Preferably, a plurality of laser beam reflectors are arranged in a preselected pattern on each of the first, second and third members (21,22,23) for reflecting a corresponding plurality of laser beams back toward the associated elements mounted on the base, first and second members (14,21,22) respectively, so that yaw, pitch and roll movements can be measured in addition to simple X, Y and Z linear displacement between the various moving stages thereof.

18 Claims, 7 Drawing Figures

COORDINATE LOCATING DEVICE

This is a continuation-in-part application of Ser. No. 30,241 filed Feb. 8, 1979, now abandoned.

DESCRIPTION

1. Technical Field

This invention relates to an apparatus having members controllably movable with respect to each other and a laser system for establishing the precise three dimensional location of a positionable element thereon.

2. Background Art

Numerically-controlled machine tools, transfer machines, and coordinate measuring machines with accurate positioning requirements have been used with separate laser transducer systems for measuring linear displacement individually along the x, y and z axes respectively. For example, Hewlett-Packard of 1501 Page Mill Road, Palo Alto, California, has developed, and manufactures, laser transducer system equipment that has a basic accuracy in the order of ½ micrometer per meter (½ microinch per measured inch). Basic resolution is one-quarter wavelength, or about 0.16 micrometers (6 microinches). Even though the individual laser transducer system components have been miniaturized, modularized and simplified, their capabilities have not been fully utilized. This is because the various tables, arms or similar elements used in the machines are serially related and travel along guideways or grooves, and the assumption has been heretofore made that the errors between the separate laser transducer system stages have been negligible. Alternately, great pains have been taken to improve the machine's geometry such as by precisely machining the guideways and grooves at great expense in order to retain the desired accuracy of measurement between the laser transducer system stages mounted separately on the relatively movable members thereof.

Thus, the basic problem with the prior art coordinate locating devices is that the various stages of the laser transducer systems incorporated therewith have not been precisely related to each other, and have not been positioned on the machine in a manner sufficient for retaining an optimum degree of accuracy. This basic problem is compounded, for example, when it is desired to accurately locate a plurality of three-dimensional coordinates on a very large workpiece. Specifically, a working region of about 16 meters long, 6½ meters wide and 4½ meters high (52'×21'×15') is required for measuring the coordinates of a large earthmoving vehicle frame weighing about 30 megagrams (66,000 lbs.). To accomplish such measurements using prior art methods involves framing huge elongate members, for example granite columns having a cross section of about 1.2 meters×1.2 meters (4'×4') into a measurement machine. Even after this spaceconsuming and rigid framework is constructed, at great expense, it is subject to the same guideway and groove problems mentioned above. Moreover, if the measurement machine is inadvertently bumped by the workpiece as it is being positioned in place by a crane operator, the accuracy of the readings could be adversely affected. Still further, after it is built it cannot be easily converted to measuring another vehicle frame having dimensions outside of the original working region.

Two types of measurement machines are respectively produced by Shelton Metrology Laboratory, of Tyler Park, Paducah, Kentucky, and by DEA (Digital Electronic Automation) of Torino, Italy. These machines have accuracies dependent upon machine geometry, and also have an undesirable depending arm having a measurement tip or probe at the distal end thereof. With such depending arm construction there is minimal bending or distortion of the arm itself by gravity. However, there are many advantages in measuring a workpiece or positioning a tool by utilizing an outstanding arm. But, heretofore, such cantilevered and movable arms have had so much "droop" as to undesirably influence the accuracy of readings taken at the end thereof, and there has been no convenient and precise way to correct therefore.

The present invention is directed to overcoming one or more of the problems as set forth above.

DISCLOSURE OF INVENTION

In accordance with one aspect of the present invention a coordinate locating device for measuring relative movement between the relative positioning of first and second members includes laser transducer means for measuring four parameters of the six parameters including X, Y and Z linear displacement and yaw, pitch and roll movement between the members. If desired, the instant coordinate measurement device can measure all six parameters. In this way the precise three-dimensional location of a positionable element on one of the members relative to a reference point on the other can be positively attained. Heretofor, errors due to angular displacement of one member relative to the other, for example, have been neglected.

In accordance with another aspect of the present invention a method of measurement or method of positioning a work element in space is provided utilizing the locating device described in the paragraph immediately above.

In accordance with another aspect of the present invention a coordinate locating device is provided between relatively moveable first and second members wherein the device includes laser transducer means having a plurality of laser beam reflectors located on the first member in a preselected orthogonal pattern for precisely measuring X, Y and Z linear displacements and also yaw, pitch and roll movements therebetween.

In accordance with still another aspect of the present invention an apparatus similar in construction to that disclosed and described in U.S. Pat. No. 3,069,778 issued Dec. 25, 1962, to F. S. Schiler and produced by the Portage Machine Company of Akron, Ohio, can incorporate a laser transducer system having the preselected orthogonal pattern of laser beam reflectors as noted immediately above in three measurement stages in order to positively and accurately relate the first, second, and third members thereof. By utilizing that general type of apparatus with its movable outstanding arm, the flexibility of the device is greatly enhanced. For example, the device can be easily relocated around the periphery of a workpiece without the need for providing costly overhead and spanning beams. Furthermore, the working region of the apparatus can be conveniently enlarged or reduced to tailor the device especially to workpieces of various sizes. All of these advantages, plus locating a point three dimensionally in space to an accuracy level of about 0.0025 mm per 250 mm (0.0001" per 10") can be achieved utilizing the device and method of the present invention.

BEST MODE FOR CARRYING OUT THE INVENTION

Figure 1:
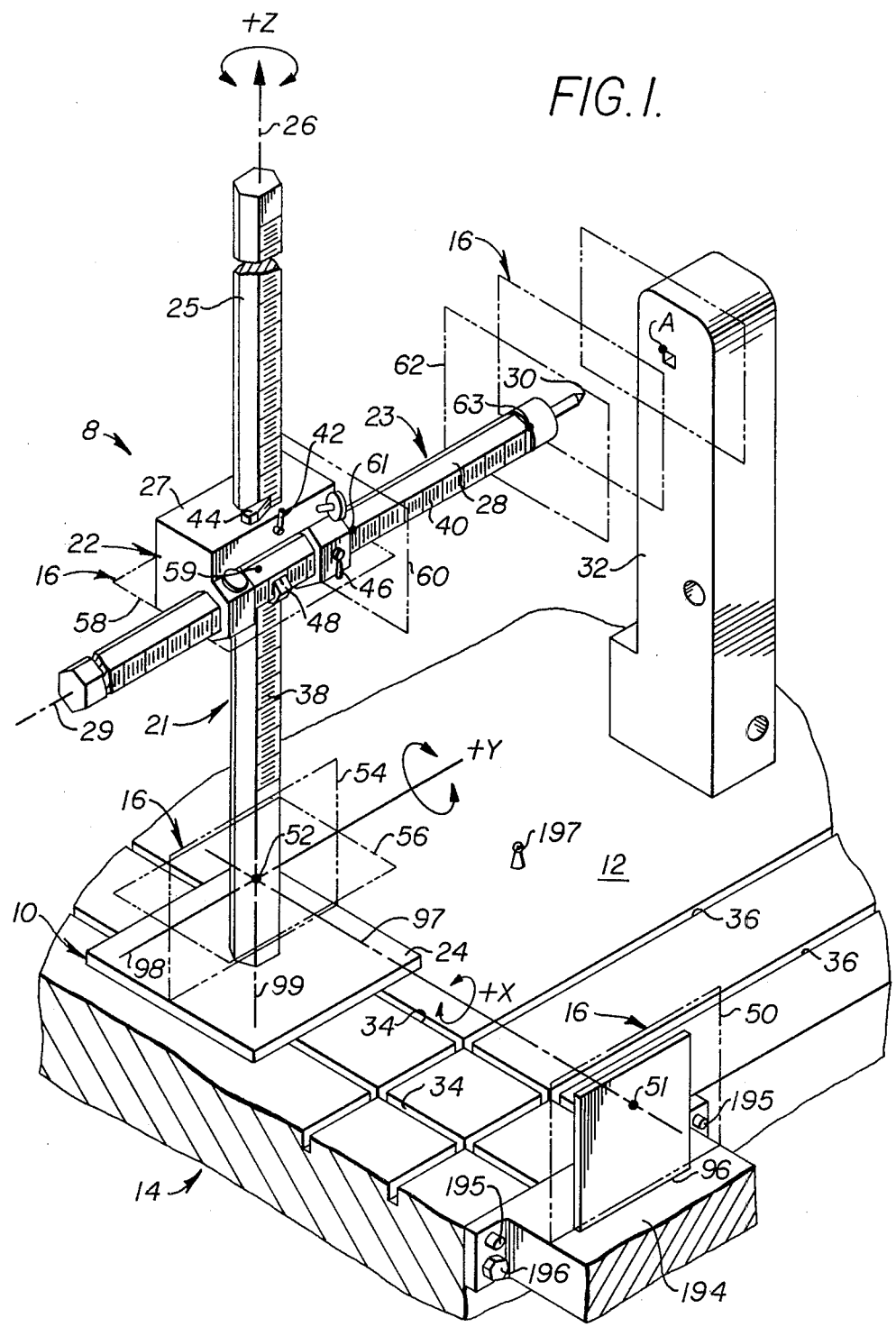
FIG. 1 is a diagrammatic, perspective view of an exemplary apparatus for measuring the three dimensional location of a point on a workpiece in accordance with one aspect of the present invention.

Referring initially to FIG. 1, a three dimensional, coordinate locating device 8 includes an apparatus or machine 10 which is mounted on a relatively flat horizontal base surface 12 of a surface table 14. In the instant example, the apparatus 10 is basically similar in construction to the measurement machine disclosed in U.S. Pat. No. 3,069,778 mentioned above and produced by the Portage Machine Company of Akron, Ohio, only it is improved by including therewith laser transducer system means 16 having three measuring stages 18, 19, and 20 as individually illustrated diagrammatically in FIGS. 2, 3 and 4 respectively.

Referring again to FIG. 1, the apparatus 10 includes first, second and third members 21, 22 and 23 respectively. The first member 21 has a base 24 and an upright standard or first elongate element 25 rigidly connected to the base and defining generally a first axis 26. The second member 22 includes a clamping unit or adapter 27 elevatably mounted on the upright standard 25, and the third member 23 includes an outstanding arm or second elongate element 28 slidably mounted within the clamping unit 27 and defining generally a second axis 29. In this way the outstanding arm 28 extends in a cantilevered fashion from the clamping unit 27 and has a measuring tip or positionable element 30 on its distal end that is positionable either in actual contact with a point on a workpiece 32 or in extremely close proximity to a preselected point on the workpiece for determining with great accuracy the three dimensional coordinates of the point with reference to the table 14.

The apparatus 10 is slidably positionable on the table 14, and for this purpose the table is provided with a first plurality of parallel grooves 34 and a second plurality of parallel grooves 36 at right angles to the grooves 34 which open upwardly to the surface 12. The base 24 of the apparatus preferably has a plurality of depending elements or wheels of known construction, not shown, that are adjustable to extend into proper contact with the base of the grooves to enable the device to be smoothly guided therealong on the table.

The upright standard 25 is preferably of hexagonal cross section, with a plurality of linear measurement graduations 38 of the usual type thereon. Similarly, the outstanding arm 28 is preferably of hexagonal cross section, with a plurality of linear measurement graduations 40. The clamping unit 27 is elevationally slidably mounted on the upright standard by internal roller bearing means, not shown, and can be rigidly secured thereto at any preselected position by manual rotation of a known locking device 42. The alignment of an adjustable vernier scale 44 with the vertical measurement graduations 38 provides a visual approximation of the elevational height of the outstanding arm 28 above the surface 12. In much the same manner, the outstanding arm is horizontally slidably mounted within the clamping unit, and can be rigidly secured thereto at any preselected position by manual rotation of another known locking device 46. The alignment of a second adjustable vernier scale 48 with the measurement graduations 40 along the arm provides a visual approximation of the horizontal displacement of the measurement tip 30 from the central axis 26 of the upright standard. For a further understanding of the construction of the clamping unit 27 and its relationship to the upright standard 25 and the outstanding arm 28 reference is made to previously noted U.S. Pat. No. 3,069,778 to F. S. Schiler, the details of which are incorporated herein by reference.

Figure 2:
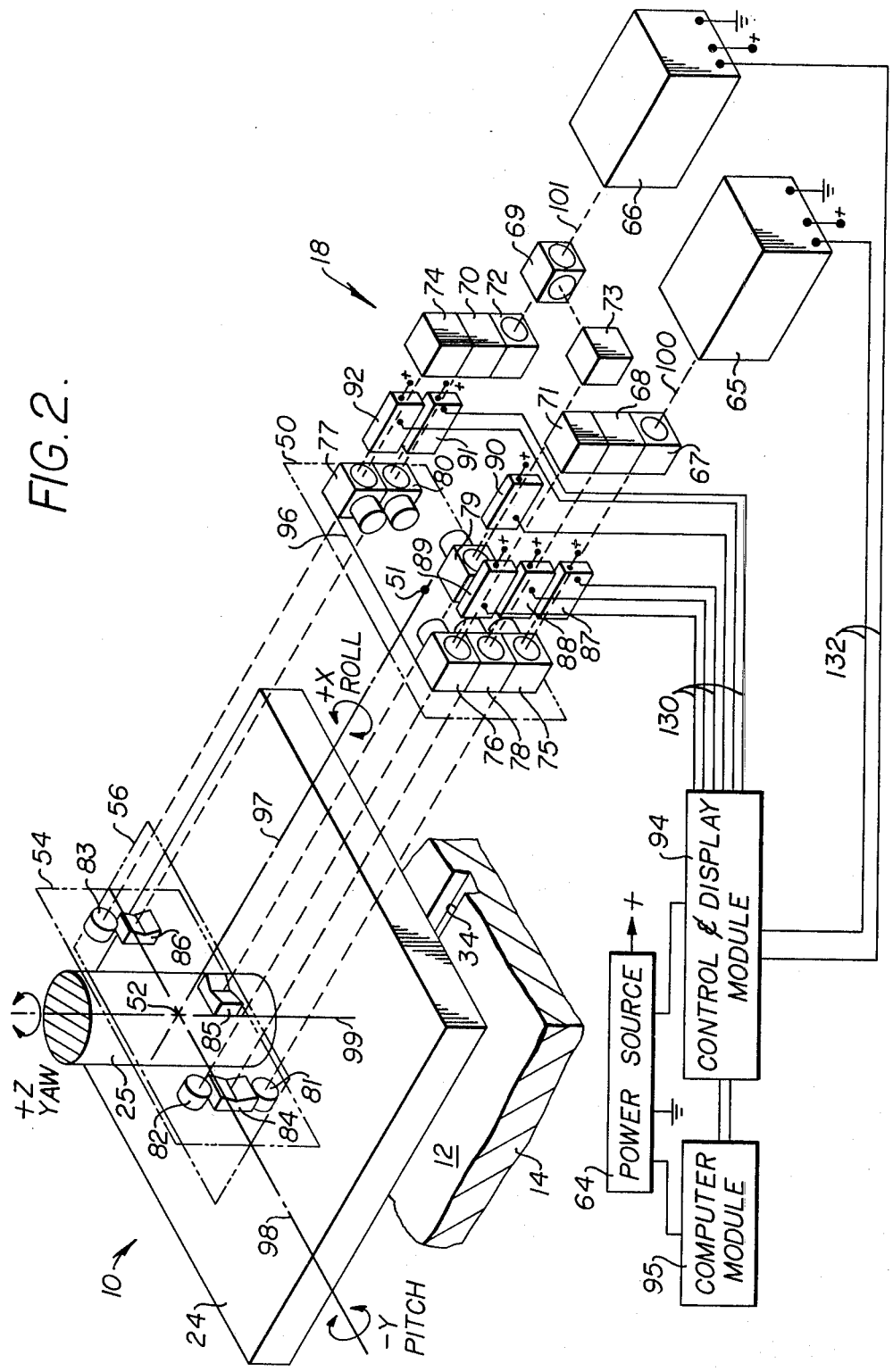
FIG. 2 is a fragmentary and diagrammatic perspective view of the lower portion of the apparatus shown in FIG. 1, with a first stage portion of the laser transducer system of the present invention incorporated therewith.
Figure 3:
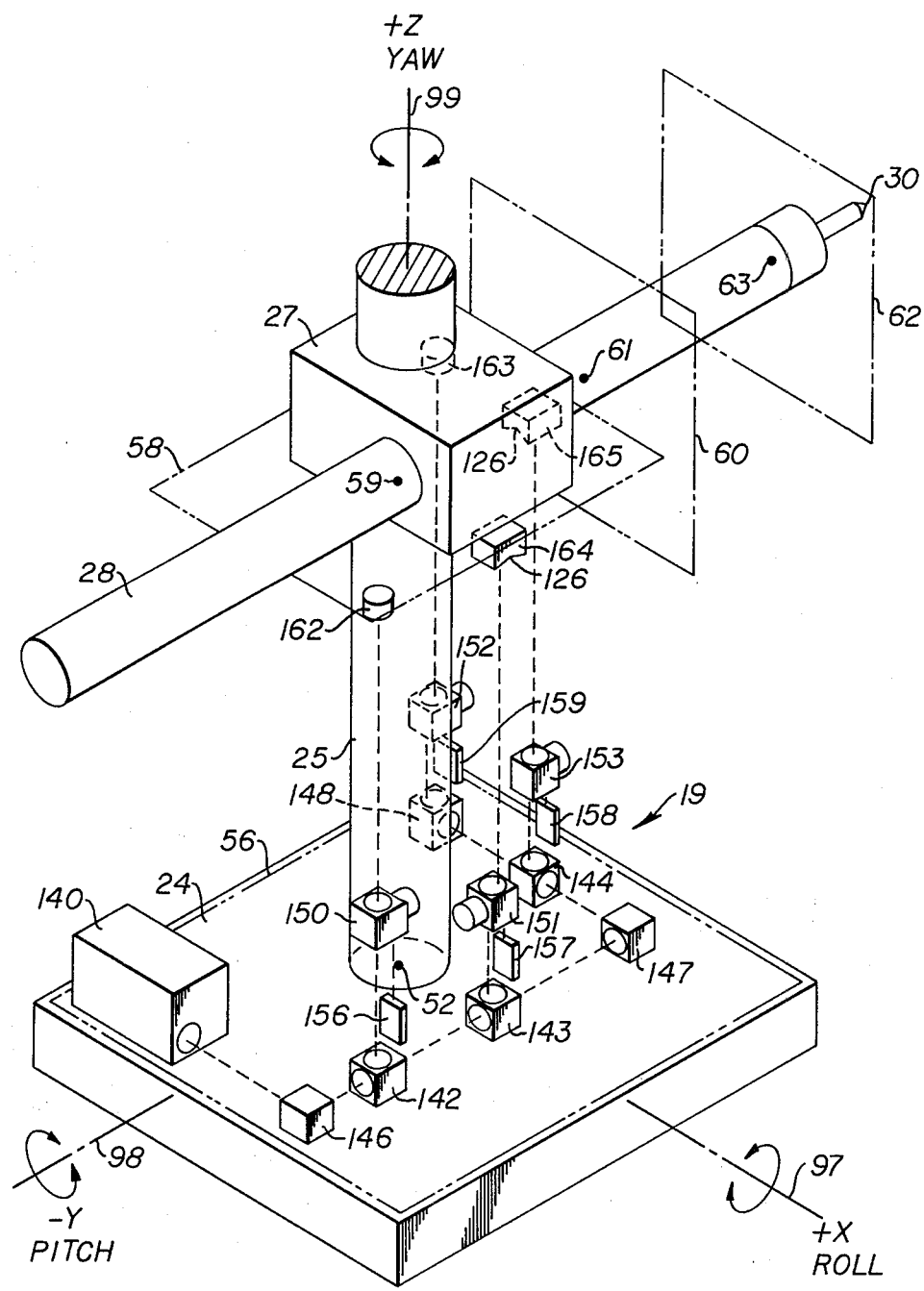
FIG. 3 is a fragmentary and diagrammatic perspective view of the apparatus shown in FIG. 1, with a second stage portion of the laser transducer system of the present invention.
Figure 4:
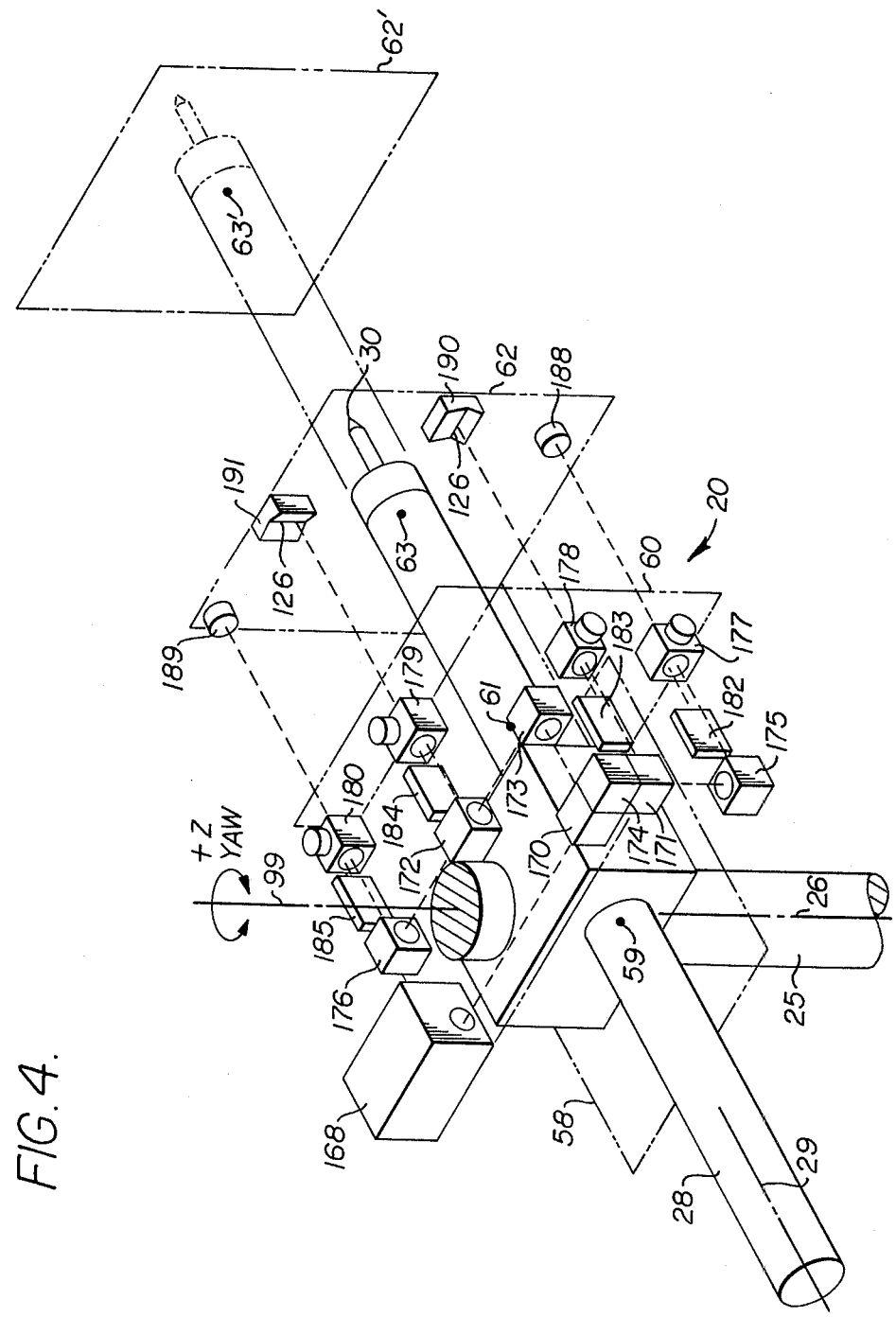
FIG. 4 is a fragmentary and diagrammatic perspective view of the upper portion of the apparatus shown in FIG. 1, with a third stage portion of the laser transducer system of the present invention.

Because the measuring tip 30 of the apparatus 10 can be extended away from the upright standard 25 a considerable distance, the arm 28 can droop, the clamping unit 27 can be deflected, and the upright standard 25 can bend sufficiently to reduce the accuracy of measurements made on the workpiece 32 using known prior art methods. In order to overcome such deficiency we contemplate using laser transducer system means 16 substantially as illustrated in FIGS. 2–4 for determining with great accuracy the location of a substantially vertical first reference plane 50 having a datum point 51 which is of preselected fixed location relative to the base surface 12, the location of a starting or first reference point 52 associated with the first member 21 adjacent the intersection of the base 24 and the upright standard 25 relative to the first reference plane 50, and the location of a substantially vertical second plane 54 passing through and establishing the position of the starting point 52. From the second plane 54, which is substantially parallel to the reference plane 50, the location of a substantially horizontal third plane 56 is derived. The third plane 56 passes through the starting point 52 and is disposed at a right angle to the second plane 54. This portion of the measurement task is accomplished by the first measuring stage 18 illustrated diagrammatically in FIG. 2. Thereafter, we contemplate using the second measuring stage 19 shown in FIG. 3, for determining the accurate location of a substantially horizontal fourth plane 58 and a second reference point 59 contained in that plane. The fourth plane 58 is of fixed location relative to the clamping unit 27 and is controllably movable from the third plane 56 and the starting point 52. The location of a substantially vertical fifth plane 60 and a third reference point 61 contained in that plane is derived from the location of the fourth plane 58 and second reference point 59, and known physical dimensions of the rigid body clamping unit 27. And lastly, we contemplate using the third measuring stage 20 shown in FIG. 4 for determining the accurate location of a substantially vertical sixth plane 62 located in fixed relation to the arm 28 adjacent the measuring tip 30, and a fourth reference point 63 in that plane which is of known location relative to the tip.

FIRST MEASURING STAGE 18

With reference now to FIG. 2, the first measuring stage 18 of the laser transducer system means 16 is seen to include a source of electrical power 64, a pair of laser transducers or laser beam generators 65, 66 connected to the power source, a plurality of beam splitters 67, 68, 69, 70, a plurality of beam benders 71, 72, 73, 74, a plurality of interferometers 75, 76, 77, 78, 79, 80, a plurality of reflectors 81, 82, 83, 84, 85, 86, a plurality of receivers 87, 88, 89, 90, 91, 92, and a control interface and counter module 94 electrically connected to the laser beam generators, the receivers and to a computer 95. In the instant example the six interferometers 75–80 are secured to a frame element 96 as shown in both FIGS. 1 and 2 in a preselected relationship to the table 14 so as to establish the first vertical reference plane 50 and the datum point 51 on the plane which can be the origin of the coordinate system (0, 0, 0). The datum point 51 lies on a true x axis 97 passing through the starting point 52. A true y axis 98 passes in a horizontal manner through the starting point 52 parallel to the plane 50 and with the x axis 97 defines the third plane 56. A true z axis 99 passes vertically through the starting point 52 and with the y axis defines the second plane 54. Thus, the coordinates of the starting point 52 are $X_1$, $Y_1$, $Z_1$.

Figure 5:
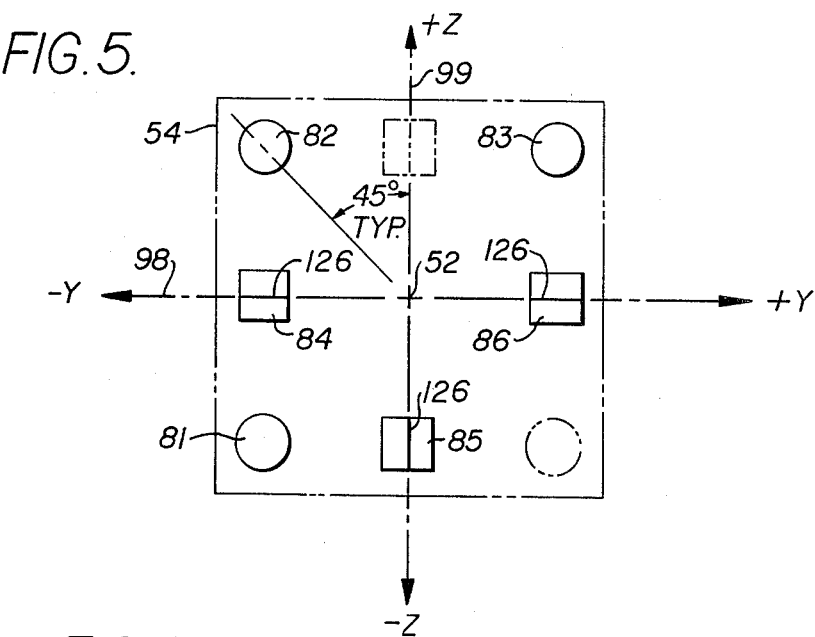
FIG. 5 is a diagrammatic view of a plane and the relationship of a plurality of reflectors disposed thereon, and forming a part of the first stage portion of the laser transducer system of the present invention.

In the instant example, the six reflectors 81–86 are mounted on the movable apparatus 10 adjacent the intersection of the base 24 and the upright standard 25 in a preselected manner on a rigid element, not shown, so as to establish precisely the second plane 54 as is illustrated in FIGS. 2 and 5. Each of the reflectors 81, 82, 83 is a measurement cube corner retroreflector that individually receives an outgoing laser beam from one of the associated linear interferometers 75, 76, 77 and returns an incoming laser beam parallel to, but displaced from, the outgoing beam for linear displacement measurement purposes. On the other hand, each of the reflectors 84, 85, 86, is a basically two plane mirror reflector that receives two outgoing laser beams from one of the associated straightness interferometers 78, 79, 80, and returns two incoming laser beams at a small included angle of convergence for measuring straightness. The reflectors 84, 86 are arranged along the y axis 98, the third reflector 85 is arranged along the z axis 99, and the three retroreflectors 81, 82, 83 are preferably arranged at equal distances from the starting point 52 on planes passing through the starting point 52 and disposed at 45° angles from the third plane 56. A corresponding orthogonal relationship exists with respect to the associated interferometers 75–80 and the datum point 51 of the reference plane 50.

More specifically, for the first measuring stage 18 we contemplate using laser beam generator and interferometry components substantially similar to the following model numbers manufactured by Hewlett-Packard of 1501 Page Mill Road, Palo Alto, California:

| Item | Model No. |
| --- | --- |
| Laser Beam Generators 65,66 | 5501A |
| Laser Beam Splitters 67,68,69,70 | 10700A,10701A & Equivalents |
| Laser Beam Benders 71,72,73,74 | 10707A |
| Linear Interferometers 75,76,77 | 10702A |
| Straightness Interferometers 78,79,80 | 10690-60001 |
| Cube Corner Retroreflectors 81,82,83 | 10703A |
| Two Plane Mirror Reflectors 84,85,86 | 10690-60002 |
| Receivers 87,88,89,90,91,92 | 10780A |
| Control & Display Module 94 | 10781A, 10741A, 10783A,C10-5510A, HB-1B(10745A), 10760A,10740A |
| Computer Module | HP-35 |
| Power Supply | Options 019 & 021 |

The referenced laser beam generators 65, 66 produce low-power helium-neon laser beams 100 and 101 in the form of a coherent beam of light having two slightly different optical frequencies, $f_1$ and $f_2$, of opposite circular polarization. The beams 100 and 101 shown in FIG. 2 are directed to the beam splitters 67, 69 where a preselected fraction of both frequencies is split off. In the case of the splitter 67, about one-third of the intensity of the beam 100 is communicated in a substantially straight line therethrough and to the linear interferometer 75, and the remaining two-thirds is deflected at right angles to the original beam direction upwardly of the beam splitter 68. The beam splitter 68 deflects about half of the laser beam entrained thereon at a right angle to the straightness interferometer 78, while the remainder passes therethrough in the original entering beam direction to the beam bender 71 and thence at a right angle to the linear interferometer 76. In the case of the splitter 69, about one-third of the intensity of the beam 101 is deflected at a right angle from the incoming beam to the beam bender 73, and thence at a right angle to the straightness interferometer 79. The other two-thirds of the beam 101 is directed straight through the splitter 69 and to the beam bender 72 where it is directed upwardly to the beam splitter 70. The beam splitter 70 deflects about half of the laser beam entrained thereon at a right angle to the straightness interferometer 80, while the remainder passes onward to the beam bender 74 and at a right angle to the linear interferometer 77. Thus, the laser beams 100, 101 from the laser beam generators 65, 66 are each divided into three portions to impinge upon the respective interferometers in substantially horizontal or parallel paths.

We contemplate employing three linear interferometers 75, 76, 77 and associated retroreflectors 81, 82, 83, and three straightness interferometers 78, 79, 80 and associated reflectors 84, 85, 86, to precisely establish the three dimensional coordinates of starting point 52 and the location of the second plane 54 passing through the starting point relative to the datum point 51 and the first plane 50. By using six interferometers, substantially as arranged in the preselected orthogonal pattern illustrated in FIG. 5, not only can X, Y, Z linear displacement be determined but also the base portion of the apparatus 10 can be limitedly varied in angularity on the table 14 in all three of the directions identified as to roll, pitch and yaw on the x, y and z axes 97, 98, and 99 respectively.

Figure 6:
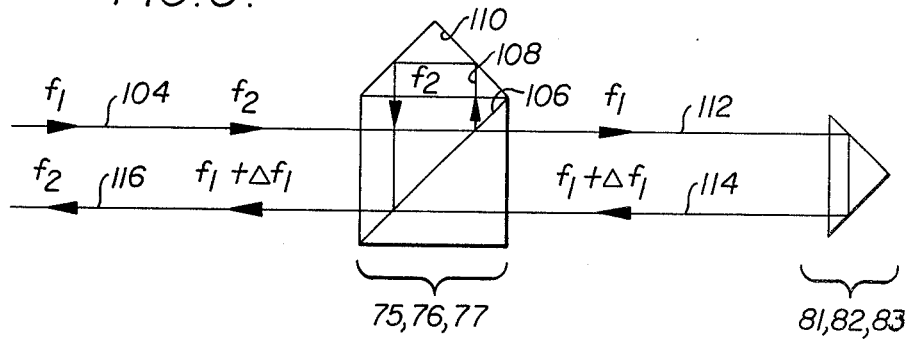
FIG. 6 is a diagrammatic view of an exemplary linear interferometer and associated retroreflector utilized in the transducer system of the present invention.

FIG. 6 shows the typical mode of operation of the linear interferometers 75, 76, 77 and the associated cube corner retroreflectors 81, 82, 83 wherein an incoming laser beam 104 is split at the surface of a polarizing beam-splitter 106, with one frequency reflected as a beam 108 to a reference cube corner 110 mounted within the interferometer and the other frequency reflected as a beam 112 to the retroreflector. The beam 112 is returned by the retroreflector along a beam path 114 parallel to, but displaced from the outgoing beam. Both frequencies are reflected back along a common axis beam path 116 to a photodetector, not shown, within one of the respective receivers 87, 89, 92, with one frequency including a Doppler frequency shift whenever the retroreflector is moved toward or away from the interferometer.

Figure 7:
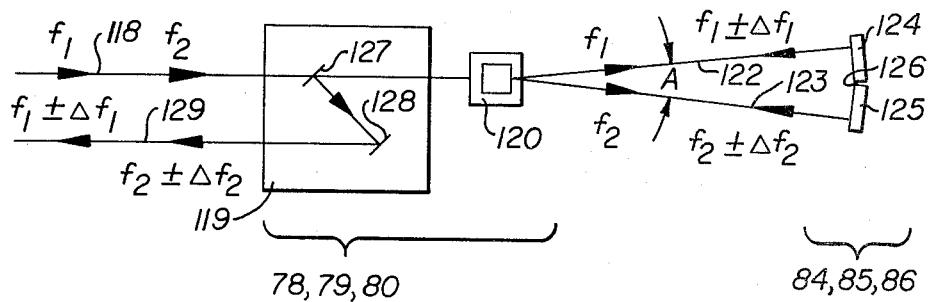
FIG. 7 is a diagrammatic view of an exemplary straightness interferometer, and associated reflector utilized in the transducer system of the present invention.

FIG. 7 shows the typical mode of operation of the straightness interferometers 78, 79, 80 and the associated two plane mirror reflectors 84, 85, 86 wherein an incoming laser beam 118 is passed through one of the interferometers including a straightness adaptor 119 and a Wollaston prism interferometer 120. Because the composite refractive index of the prism interferometer is different for the two planes of polarization which distinguish $f_1$ and $f_2$, $f_1$ and $f_2$ exit as beams 122 and 123 having a small included angle A between them. These beams are reflected back by a pair of mirrors 124, 125 having a common axis of intersection 126 and being rigidly mounted at an included angle precisely matched to the prism interferometer 120. The beams are recombined within the prism interferometer and the combined outgoing beam is returned coaxially with the incoming beam to a partial mirror 127 in the straightness adaptor 119. The majority of this returning combined beam is reflected downwardly when viewing the drawing to a mirror 128 which reflects it back into one of the respective receivers 88, 90, 91 along a beam path 129. This system measures the relative lateral displacement between the interferometer and the axis 126 of the mirrors 124, 125. Whether the measurement will be in a horizontal or vertical plane depends on the orientation of the mirrors and the prism interferometer within their mounts. In this regard it is contemplated that each of the interferometers, reflectors, receivers, beam benders and splitters is seated on a known adjustable mount, not shown, of the type, for example, manufactured by Hewlitt-Packard and identified as Model Nos. 10710A and 10711A.

Relative lateral displacement between the prism interferometer 120 and the mirrors 124,125 affects the difference in optical path lengths between the two beams causing a difference in accumulated fringe counts. Movement of one of the reflectors 84,85,86 with respect to the beams 122,123 causes a lengthening in the beam from the side to which the retroreflector moves, and a shortening of the opposite beam. For movement of the interferometers 78,79,80 with respect to the axis 126 of the reflectors there is an optical path length change within the prism interferometer proportional to the difference in the refractive indices specific to each plane of polarization. In either case, for a relative lateral translation x the fringe counts accumulated will be given by $2 \times \sin A/2$, where A is the included angle between the beams as shown in FIG. 7. However, if the beam moves with respect to the mirror axis any path length change in the air space is balanced by a compensating optical path length difference within the prism. Thus the device is insensitive to spatial deviations of the laser beam.

The individual modes of operation of the linear and straightness interferometers 75-80, and the associated reflectors 81-86 discussed above with respect to FIGS. 6 and 7 are known in the art.

Referring again to FIG. 5, we contemplate that the two plane mirror reflectors 84 and 86 should preferably be arranged generally symmetrically on the opposite sides of the starting point 52 at a preselected distance apart, and with their axes 126 aligned substantially parallel to the y axis 98. The other two plane mirror reflector 85 should preferably be located at a preselected distance from the y axis 98 such that its axis 126 is aligned substantially parallel to the z axis 99, or at a right angle to the axis of the reflectors 84 and 86. We furthermore prefer that the three cube corner retroreflectors 81, 82, 83 be located at about equal distances from the starting point 52 or the x axis 97, which axis passes through the intersection of the axes 126 of the reflectors 84, 85, 86. With this arrangement the corner retroreflectors 81, 82, 83 should be located on planes passing through the x axis 97 and starting point 52 at an angle of 45° from the axes 98 and 99 as shown by the example. Thus, a preselected geometric pattern of the reflectors is established which is duplicated by the respective interferometers 75-80 on the plane 50, as may be noted with reference to FIG. 2. Substantially all degrees of angularity of the base portion of the apparatus relative to the table 14 are accounted for by such orthogonal pattern. The receivers 87-92 are located in the same general x axis direction as the respectively associated interferometer 75-80, are laterally offset from the outgoing laser beam, and are disposed in the path of the incoming laser beam. These receivers subsequently direct electrical signals to the control and display module 94 through a plurality of electrical conduits 130. The receivers and the laser beam generators 65, 66 are supplied with power from the power source 64 in a conventional manner as is schematically illustrated, as are also the control and display module 94 and the computer module 95. Moreover, the laser beam generators direct reference signals to the control and display module through a plurality of electrical conduits 132 to generate reference frequencies and to tune the system as is known in the art.

We contemplate mounting the reflectors 81-86 in a relatively rigid frame, not shown, at the base portion of the apparatus 10 adjacent the intersection of the base 24 and the standard 25. While it is preferred that all of the reflectors be mounted on a substantially common plane parallel to the second plane 54, it is to be appreciated that the reflectors may be positioned at various fixed distances in the direction of the x axis 97 from a common plane without departing from the spirit of the present invention.

The computer 95 and control and display module 94 are so constructed and arranged as to fully receive the fixed geometric relationships of the reflectors 81-86 relative to the base 24, so that with the subsequent input signals to the receivers 87-92 the locations of the theoretical second plane 54 and starting point 52 can be accurately established no matter how the base 24 may pitch, roll or yaw with respect to the table 14 within a relatively broad tolerance range. In this regard, the coordinate locating device 10 of the present invention will allow a looser tolerance fit between the apparatus and the grooves 34, 36 in the table than prior art systems because of its built-in compensation capabilities.

Second Measuring Stage 19

With the location of the movable second plane 54 and starting point 52 precisely established with respect to the base 24 of the apparatus 10, the computer 95 can internally automatically establish the relationship of the third plane 56 normal thereto. As is illustrated in FIG. 3, the second measuring stage 19 can then establish precisely the location of the movable fourth plane 58 and the second reference point 59 centrally located thereon by relating it to the third plane 56 are starting point 52 having a known relationship to the base 24. Such fourth plane 58 is a theoretical plane which is essentially fixed to, and elevationally movable with the clamping unit 27.

The second measuring stage 19 includes a single laser transducer or laser beam generator 140, a plurality of beam splitters 142, 143, 144, a plurality of beam benders 146, 147, 148, a plurality of interferometers 150, 151, 152, 153, and a plurality of receivers 156, 157, 158, 159, arranged in a preselected geometrically established orthogonal pattern in fixed relation on or near the base 24 of the apparatus 10. On a suitable frame, not shown for illustrative convenience, rigidly secured to the clamping unit 27 are a pair of cube corner retroreflectors 162, 163 and a pair of two plane mirror reflectors 164, 165 which face downwardly to receive the laser beams from the respective interferometers 150-153. The laser beam generator 140 is comparable to the laser beam generators 65, 66, the beam benders 146-148 are like the beam benders 71-74, and the receivers 156-159 are similar to the receivers 87-92 described above with respect to the first measuring stage 18. The beam splitter 142 deflects about one-fourth of the intensity of the beam received from the beam bender 146 to the linear interferometer 150, the beam splitter 143 deflects about one-third of the intensity of the beam received from the beam splitter 142 to the straightness interferometer 151, and the beam splitter 144 deflects about half of the intensity of the beam received from the beam bender 147 to the straightness interferometer 153. We note that while the electrical connections between the generator and the receivers 156-159 with the power source 64, and the control and display module 94 shown in FIG. 2 have been omitted from FIG. 3 for illustrative convenience, such connections are similar to those described with respect to the first measuring stage 18.

Referring now to the linear interferometers 150, 152 and the associated cube corners retroreflectors 162, 163, it can be appreciated that they operate together for displacement measurement purposes in the same way as described in the first measuring stage 18 in connection with FIG. 6. Likewise, the straightness interferometers 151, 153 and the associated two plane mirror reflectors 164, 165 work together substantially as described eariler in connection with FIG. 7. It can be noted from FIG. 3 that the four reflectors are again advantageously mounted on the clamping unit 27 in a preselected orthogonal pattern, wherein the axes 126 of the reflectors 164, 165 are normal to each other, are aligned generally parallel to the x axis 97 and y axis 98 respectively, and are preferably substantially equally spaced from a second reference point 59 elevationally above starting point 52 or from the true z axis 99. The retroreflectors 162, 163 are substantially equally spaced from the z axis 99 also and located on the opposite sides thereof on a plane passing approximately through the z axis at an angle of 45° from an xz plane or an yz plane.

It will be noted that the second measuring stage 19 has only four reflectors 162-165 while the first measuring stage 18 has six reflectors 81-86. This is because for economic reasons, the assumption is made that the clamping unit 27 is relatively thick in the direction of the z axis 99 so that, in effect, there would be minimal pitch rotation of the clamping unit and the fourth plane 58. Also, the assumption is made that the linear displacement measurement in the x direction is minimal. Since the clamping unit 27 is secured to the upright standard 26 in a substantially rigid relationship upon securing the locking device 42 noted previously with reference to FIG. 1, these assumptions are reasonable. However, if other forms of machine tools, for example, are substituted for the apparatus 10 then we contemplate that for greater accuracy in connection with all three linear displacement measurements and all three motions of roll, pitch and yaw of the clamping unit 27 on the standard 25 that six reflectors be utilized in the same orthogonal pattern set forth above in connection with the first measuring stage 18, or generally like the pattern illustrated in FIG. 5.

The computer 95 and the control and display module 94 are again so constructed and arranged as to receive the fixed geometric relationships of the reflectors 162-165 relative to the clamping unit 27, so that with the subsequent input signals to the receivers 156-159 the locations of the theoretical fourth plane 58 and the second reference point 59 are precisely established despite whether the upright standard 26, for example, is bent or inclined relative to the base 24 within reasonable limits, or whether some inclination or offset of the clamping unit 27 is established after locking it to the standard.

In summarizing the construction of the second measuring stage 19, proper orthogonal placement of the linear displacement measuring members 150,162 and 152,163 can allow two out of three of the following parameters to be obtained if minimal errors or changes are assumed in the third parameter; z displacement, roll and pitch. Likewise, the proper orthogonal placement of the straightness measuring members 151,164 and 153,165 can allow two out of the following three parameters to be obtained if a minimal error is assumed in the third: x displacement, Y displacement and yaw. Because of the construction of the exempliary coordinate locating device 8 the pitch and X displacment measurements represent the lowest error contributors and so can be neglected to allow the simpler construction illustrated.

Third Measuring Stage 20

With the location of the theoretical fourth plane 58 and the reference point 59 positively established within the computer module 95, the position of and theoretical fifth plane 60 normal thereto and the reference point 61 thereon can be determined. As is illustrated in FIG. 4, the third measuring stage 20 includes a single laser transducer or laser beam generator 168, a plurality of beam splitters 170, 171, 172, a plurality of laser beam benders 173, 174, 175, 176, a plurality of interferometers 177, 178, 179, 180, and a plurality of receivers 182, 183, 184, 185 mounted on a frame, not shown, rigidly secured to the clamping unit 27. The physical parameters or locations of the interferometers 177-180 are thus established as, for example, by taking into account the distance between the actual axis 26 and the actual axis 29 with respect to the clamping unit and locating such interferometers orthogonally from the axis 29 on the plane 60 in a preselected pattern.

The beam splitter 170 deflects about one-half of the intensity of the beam received from the laser beam generator 168 to the beam bender 173, and the remainder is passed through to the beam bender 174 and to the beam splitter 171. The beam splitter 171 deflects about one-half of the intensity of the beam to the straightness interferometers 178, while the remainder passes to the linear interferometer 177 via the beam bender 175. The beam splitter 172 deflects about half the intensity of the incoming beam to the straightness interferometer 179, and the remainder passes to the linear interferometer 180 via the beam bender 176.

In a manner similar to the second measuring stage 19 discussed in connection with FIG. 3, the third measuring stage 20 utilizes the pair of linear interferometers 177, 180 in conjunction with a pair of cube corner retroreflectors 188, 189 and the pair of straightness interferometers 178, 179 in conjunction with a pair of two plane mirror reflectors 190, 191. These reflectors are mounted on a frame, not shown, rigidly secured to the outstanding arm 28 adjacent the extremity or distal end thereof, at a precisely defined or known distance from the measuring tip 30. They operate like the corresponding elements discussed with respect to FIGS. 6 and 7.

The reflectors 188–191 are disposed in a preselected orthogonal pattern substantially like that of the reflectors 162–165, with the axes 126 of the reflectos 190, 191 being normal to each other, and intersecting about on the axis 29, or such as being generally parallel with z axis 99 and the x axis 97 respectively. Also, the cube corner retroreflectors 188, 189 are disposed diagonally opposite each other in a plane passing generally through the axis 29 and arranged at 45° angle from the axes 126 of the two plane mirror retroreflectors 190, 191. Because of the instant construction of the apparatus 10, only four reflectors are used in the third measuring stage 20 although, as mentioned earlier, it is to be understood that for greater accuracy six reflectors would be required between stages to take into account all three linear displacement measurements and all three motions of angular movement of the distal end of the outstanding arm 28 relative to the clamping unit 27, and namely roll, pitch and yaw thereof.

Thus, proper orthogonal placement of the linear displacement measuring members 177,188 and 180,189 can allow two out of the following three parameters to be obtained if minimal errors are assumed in the third: Y displacement, yaw and roll. Similarly, proper orthogonal placement of the straightness measuring members 178,190 and 179,191 can allow two out of the following three parameters to be obtained if minimal error is assumed in the third: X displacement, Z displacement and pitch. In the third measuring stage 20 the yaw and pitch measurements are reasonably minimal and can be assumed negligible for convenience and simplicity.

Industrial Applicability

In operation, the fixed elements of the first measuring stage 18 illustrated in the right-hand lower area of FIG. 2 are preferably mounted on a suitable platform 194 releasably connected to the table 14 as by a plurality of locating dowels 195 and a plurality of fastening devices 196 as shown in FIG. 1. For example, the interferometers 75–80 and the upstanding frame element 96 would be rigidly secured to the platform. The apparatus 10 with the remaining elements of the first measuring stage, and with the majority of the elements of the second and third measuring stages 19 and 20 thereon is longitudinally located in the grooves 34 in such a way that the arm 28 can be aligned with a plurality of fixed datum points 197, one shown, on the table. The computer module 95, the control and display module 94, and the operational laser transducer system means 16 can then establish the x, y and z locations of the measuring tip, which are preferably then manually set at 0, 0, 0.

With the zero coordinates set, the apparatus 10 can be moved upwardly to the left when viewing FIGS. 1 and 2 away from its aligned position with the datum points 197 and to a position of alignment with the workpiece 32. The first measuring stage 18 continually monitors the laser beam signals from the reflectors 81–86 as they move away from the respective receivers 87–92. Particularly, the control and display module 94 counts the interfering change in laser beam signals returning from the retroreflectors 81, 82, 83 along the three beam paths 116 as diagrammatically indicated in FIG. 6, and also counts the interfering change in laser beam signals returning from the reflectors 84, 85, 86 along the three beam paths 129 as similarly shown in FIG. 7. Relative motion causes a Doppler shift in the different frequencies measured by the receivers 87–92. Each output signal from a reciever is compared with a reference signal on a cycle-by-cycle basis in the control and display module, and internal circuitry produces an appropriate up or down output pulse whenever one of the signals gets one-half cycle ahead of or behind the other. Each pulse corresponds to a reflector movement of one-quarter wavelength of light. Such mode of operation is known in the art, for example this is known with respect to the aforementioned 5501A Laser Transducer system manufactured by Hewlett-Packard.

Thus, the precise location of the starting point 52 and the reference plane 54 is established, even though the base 24 of the apparatus 10 may roll, pitch or yaw because of the preselected orthogonal pattern of the reflectors 81–86 illustrated in FIG. 5 and dicussed previously.

Next, the clamping unit 27 is unlocked from its relatively low and rigidly secured position on the standard 25 where it had been aligned with the zero datum point 197, and is elevated and guided therealong to a position approximately aligned with a point A to be measured on the workpiece 32. Then the outstanding arm 28 is unlocked from its rigidly secured position on the clamping unit 27 where it had been aligned with the datum point 197, and is extended therefrom to a point touching or at a preselected controlled minimal distance from the point A. At this stage the locking devices 42, 46 may be engaged to connect the relatively movable elements of the apparatus securely together. The second and third measuring stages 19, 20 operate the much the same way as discussed above with respect to the first measuring stage, only each has four returning reference beam paths rather than six. Nevertheless, each returning beam path 116, 129 is continually monitored as the clamping unit is guided along the standard and as the outstanding arm is guided outwardly from the clamping unit. The shift in frequencies resulting from relative movement is again counted and the results fed into the internal program of the computer 95 whereupon the precise x, y and z coordinates of the point A can be displayed for convenient visual reference.

As can be visualized by reference to FIGS. 1 and 2, the above-described system advantageously permits the platform 194 and the associated elements of the first measuring stage 18, including the control and display module 94 and the computer module 95 for example, to be relocated as a unit to any other work position around the periphery of the table 14. Only the fastening devices 196 have to be released from the table to enable the platform and associated elements to be moved to another location whereupon the fastening devices are reengaged with the table. Simultaneously, the apparatus 10 can be relocated to a guided relationship in the grooves 36, for example. Upon such relocation, the measuring tip 30 of the apparatus 10 can be reestablished against the plurality of the datum points 197, or their equivalent elsewhere on the table, and the coordinates reset to 0, 0, 0 by manual control of the computer module and control and display module. Hence, the coordinates of any point on even a huge or extremely complex workpiece 32 can be conveniently established, one to the other. Moreover, the working region can be easily expanded by manufacturing the table in modules, for example—it only being necessary to precisely establish another plurality of zero datum points, like the point 197 thereon.

It is therefore apparent that the coordinate locating device 8 of the present invention can precisely establish the three dimensional coordinates of the measurement tip 30 or equivalent positionable element such as a machine tool, camera lens, robot arm or the like.

In connection with the preselected orthogonal pattern of the reflectors between stages, we recognize that in order to optimize the accuracy of the laser transducer system 16 four cube corner retroreflectors and four two plane mirror reflectors should be utilized to average out more positively all three linear displacement measurements and all three motions of angular movement of one member on the other, and namely roll, pitch and yaw. However, this would be too costly and since the base 24 of the coordinate measurement apparatus 10 is urged by gravity against the table 14, three reflectors of each type are deemed to be sufficient. Unlike the unclamped first stage, the second and third stages have a clamped construction such that a further economic and measurement compromise can be made to two reflectors of each type. However, we believe that at least two two-plane mirror reflectors 84, 85 or 85, 86 with their axes 126 substantially normal to each other and intersecting at about the point 52, and at least two cube corner retroreflectors 81, 83 arranged at diagonally opposites sides of the point 52 and on a 45° angle plane relative to the axes 126 are desired in order to obtain a preselected degree of accuracy between any two members on a locating device experiencing a controlled amount of relative angular movement such as a relatively limited degree of yaw, pitch and roll in addition to simple linear displacement.

Other aspects, objects and advantages of this invention can be obtained from a study of the drawings, the disclosure and the appended claims.

What is claimed is:

1. A coordinate locating device (8) for measuring relative movement between first and second members (21,22/22,23), comprising:
    laser transducer means (19/20) for measuring four parameters of the six parameters including X, Y and Z linear displacement and yaw, pitch and roll movement between the members (21,22/22,23) and obtaining the X, Y, Z coordinates of a point (59,51) on the second member (22,23), said laser transducer means (19/20) providing a plurality of coherent beams of light individually having two different optical frequencies of opposite circular polarization, each of the selected four parameters being individually measured by laser interferometric techniques.

2. The coordinate locating device (8) of claim 1 wherein the laser transducer means (19/20) includes two reflectors (162,163/188,189) connected to one of the members (21,22/22,23), each of the reflectors (162,163/188,189) being of a construction sufficient for receiving one frequency of the beam of light and returning it back to the other one of the members (21,22/22,23).

3. The coordinate locating device (8) of claim 2 wherein the reflectors (162,163/188,189) are cube corner retroreflectors.

4. The coordinate locating device (8) of claim 2 wherein the laser transducer means (19/20) includes two two plane mirror reflectors (164,165/190,191) individually having a mirror axis (126), and wherein the mirror axes (126) are normal to each other.

5. The coordinate locating device (8) of claim 2 wherein the laser transducer means (19/20) includes two linear interferometers (150,152/177,180) connected to the other one of the members (21,22/22,23) and facing the two reflectors (162,163/188,189).

6. The coordinate locating device (8) of claim 5 including two receivers (156,159/182,185) connected to the other one of the members (21,22/22,23).

7. A coordinate locating device (8) comprising:
    first and second members (14,21), said second member (21) being controllably movable relative to said first member (14); and
    laser transducer means (18) for precisely and individually measuring X, Y and Z linear displacement and yaw, pitch and roll movement of said second member (21) relative to said first member (14), said laser transducer means (18) including a plurality of laser beam reflectors (81-86) located on one of said members (14,21) in a preselected pattern and obtaining the X, Y, Z coordinates of a point (52,59,61) on the second member (21), said laser transducer means (18) providing a plurality of coherent beams of light individually having two different optical frequencies of opposite circular polarization.

8. The coordinate locating device (8) of claim 7 wherein said first member (14) is a table (14), said second member (21) includes a base (24) and an upright standard (25) connected to said base (24), said base (24) being mounted on said table (14), and said reflectors (81-86) being mounted on said second member (21) adjacent the intersection of said standard (25) and said base (24).

9. The coordinate locating device (8) of claim 8 including a third member (22) controllably elevatable on said standard (25), and including second laser transducer means (19) for individually measuring four parameters of the six parameters including X, Y and Z linear displacement and yaw, pitch and roll movement of said third member (22) on said standard (25), said second laser transducer means (19) providing a plurality of coherent beams of light individually having two different optical frequencies of opposite circular polarization.

10. The coordinate locating device (8) of claim 9 including a fourth member (23) controllably guided on said third member (22) and including third laser transducer means (20) for individually measuring four parameters of the six parameters including X, Y and Z linear displacement and yaw, pitch and roll movement of said fourth member (23) on said third member (22), said third laser transducer means (20) providing a plurality of coherent beams of light individually having two different optical frequencies of opposite circular polarization.

11. The coordinate locating device (8) of claim 7 wherein said reflectors (81-86) include three cube corner retroreflectors (81,82,83).

12. The coordinate locating device (8) of claim 7 wherein said plurality of laser beam reflectors (81-86) includes two two plane mirror reflectors (84,85) and two cube corner retroreflectors (81,83) mounted on said second member (21).

13. The coordinate locating device (8) of claim 12 wherein each of said two plane mirror reflectors (84,85) has a mirror axis of intersection (126), said mirror axes (126) being disposed substantially normal to each other and defining an intersection point (52).

14. The coordinate locating device (8) of claim 13 wherein said cube corner retroreflectors (81,83) are located diagonally opposite one another substantially equally spaced away from said intersection point (52).

15. In a coordinate locating device (8) of the type having a reference base (12) and first, second, and third members (21,22,23), the first member (21) being movable with respect to the reference base (12), the second member (22) being movable with respect to the first member (21), and the third member (23) being movable with respect to the second member (22), the improvement comprising:
first measuring stage means (18) for individually measuring X, Y and Z linear displacement and yaw, pitch and roll movement of said first member (21) on said base (12), said first measuring stage means (18) including means (64-86) for generating a plurality of coherent beams of light individually having two different optical frequencies of opposite circular polarization, directing, and reflecting a plurality of laser beams between said first member (21) and said base (12), said first measuring stage means (18) including three cube corner retroreflectors (81,82,83).

16. The coordinate locating device (8) of claim 15 including second measuring stage means (19) for individually measuring four parameters of the six parameters including X, Y and Z linear displacement and yaw, pitch and roll movement between said second member (22) and said first member (21) by laser interferometric techniques, said second measuring stage means (19) including means (140-153, 162-165) for generating, directing, and reflecting a plurality of laser beams between said second member (22) and said first member (21), said second measuring stage means (19) including two cube corner retroreflectors (162,163).

17. The coordinate locating device (8) of claim 16 including third measuring stage means (20) for individually measuring four parameters of the six parameters including X, Y and Z linear displacement and yaw, pitch and roll movement between said third member (23) and said second member (22) by laser interferometric techniques, said third measuring stage means (20) including means (168-180, 188-191) for generating, directing and reflecting a plurality of laser beams between said third member (23) and said second member (22), said third measuring stage means (20) including two cube corner retroreflectors (188,189).

18. The coordinate locating device (8) of claim 17 wherein each of the first, second and third measuring stage means (18,19,20) includes two two plane mirror reflectors (84, 85, 164, 165, 190, 191).

* * * * *